July 17, 1951 W. R. WOODWARD 2,560,709

CLIPPING AMPLIFIER

Filed July 22, 1947

INVENTOR
W. R. WOODWARD
BY H. O. Lattimer
ATTORNEY

Patented July 17, 1951

2,560,709

UNITED STATES PATENT OFFICE 2,560,709

CLIPPING AMPLIFIER

William Redin Woodward, Plandome Heights, N. Y., assignor to American Telephone and Telegraph Company, a corporation of New York Application July 22, 1947, Serial No. 762,678

10 Claims. (Cl. 179—171)

Figures 1, 2, 3:
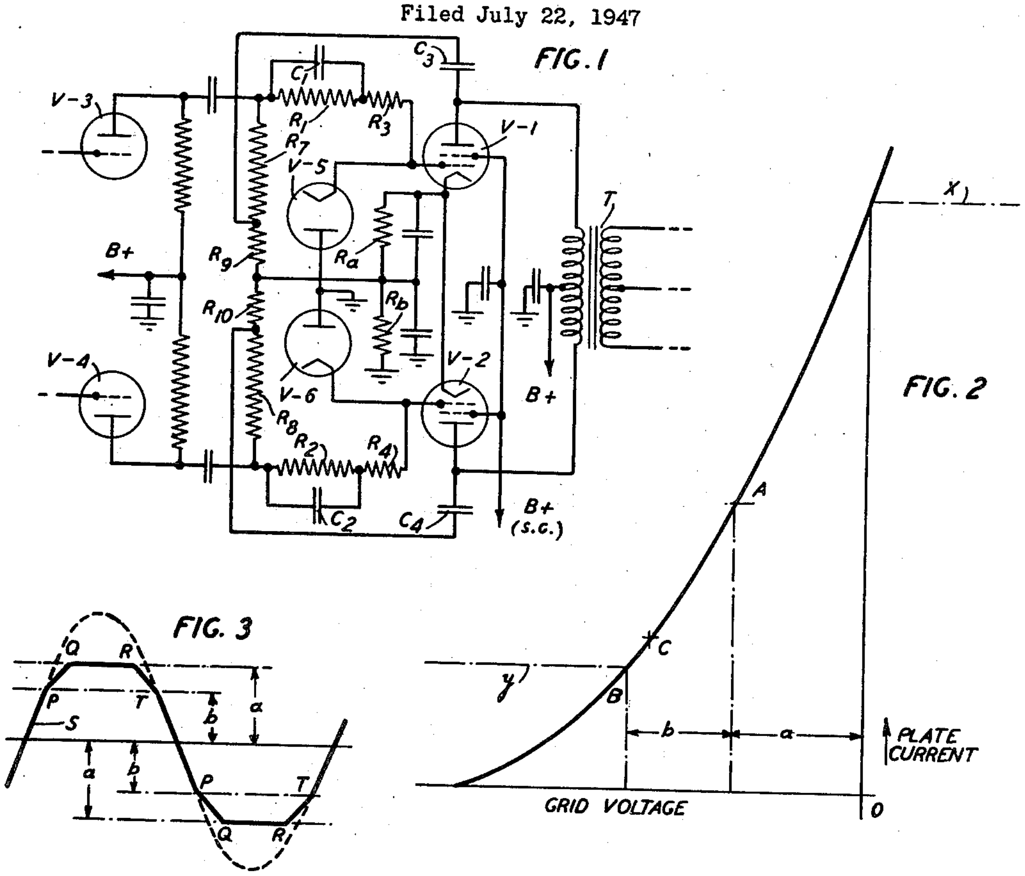

This invention relates to amplitude range changers as, for example, clipping amplifiers.

Amplifiers which distort speech signals by clipping the peaks of the waves of relatively high amplitude are finding increasing use in radio communication because it has been observed that a great deal of clipping may be permitted without serious loss of intelligibility of the signal. When a severe limitation is imposed by the power capabilities of the transmitter, as is particularly the case in mobile equipment, the loss of intelligibility resulting from a considerable amount of clipping is more than made up by the much greater audibility of the signal resulting from the increased amplification of those parts of the signal having relatively small amplitude, such as consonant sounds.

It is well known that when clipping occurs in an amplifier, however, the sudden transitions introduced into the wave form involve the addition of a substantial amount of high-frequency audio components to the signal. In radio transmission it is very important to remove such high audio frequencies before modulating the transmitter with the signal, in order to avoid "splatter" which might interfere with adjacent communication channels. It is therefore common to apply a low-pass filter to the audio signal after clipping and before modulation. One of the effects of the filter, however, may be to permit the signal to overshoot the amplitude corresponding to the previous clipping level, so that the wave is no longer clipped at a fixed maximum amplitude, making it more difficult to operate the transmitter close to the 100% modulation point. If the filter is in a low-level stage of the transmitter, it and the following stages will introduce a certain amount of phase shift which will change the shape of the clipped wave and impair the effectiveness of clipping, whereas if the clipping is accomplished at a high audio level, the filter components must be able to withstand relatively high voltage.

This invention purposes to provide a clipping amplifier which effectively clips the signal without the sudden transitions in the wave form which give rise to substantial amounts of splatter-producing high frequencies. By avoiding the production of such high audio frequency components in the clipping process one may be able to avoid the necessity of providing filters to remove such components after the clipping stage. In the amplifiers specifically described herein, the modification of the clipping operation to avoid sudden transitions is accomplished in one or more of the following ways: (1) operating a push-pull amplifier so that one side of the circuit clips the signal wave shortly before the other side begins to clip; (2) partially by-passing for high frequencies a high resistance used in a push-pull grid circuit to produce clipping; and (3) application of negative feedback to the clipping stage, with such feedback being relatively more effective at high audio frequencies.

Other objects and aspects of the invention will be apparent from the following description and claims.

Figure 4:
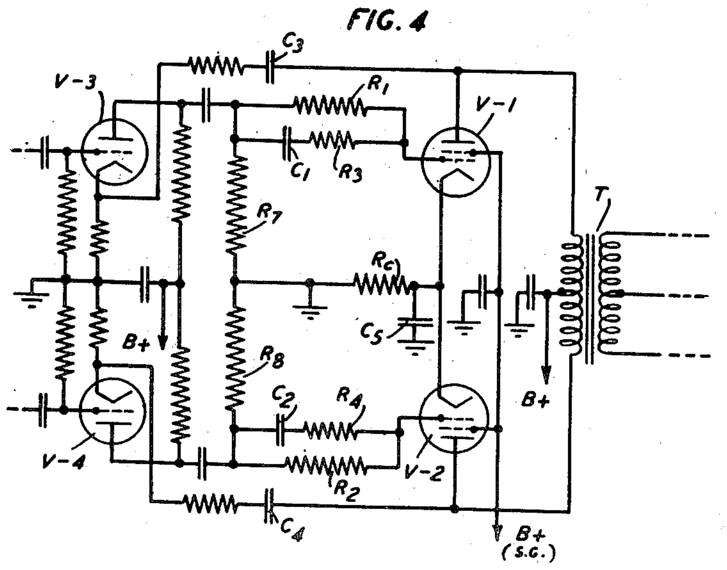

In the appended drawings, Figure 1 shows one embodiment of the invention in the form of a clipping amplifier with means to avoid sharp transitions in the output wave form; Figs. 2 and 3 are diagrams to illustrate certain features of the operation of such amplifiers; and Fig. 4 illustrates an embodiment of the invention in another form of clipping amplifier having means to mitigate sudden transitions in the output wave form.

In the amplifier shown in Fig. 1, clipping is accomplished in the circuits associated with tubes V—1 and V—2, which are power amplifier tetrodes in a push-pull circuit. The output transformer T may cause the signal to modulate the plate voltage of a radio-frequency amplifier (not shown), or it may couple the output to a following class B audio amplifier (not shown). The signal is provided to the circuits associated with tubes V—1 and V—2 from the plate circuits of push-pull voltage amplifier tubes V—3 and V—4, through conventional resistance-capacity coupling. The signal voltage provided by tubes V—3 and V—4 is sufficient to over-drive tubes V—1 and V—2 considerably during the large-amplitude portions of the signal. Resistors $R_1$ and $R_3$ cause positive signal peaks to be clipped in tube V—1 as soon as grid current starts to flow in that tube and a similar clipping effect is produced on negative peaks as soon as diode V—5 begins to draw current.

Resistor $R_1$ is by-passed by a small condenser $C_1$. (Similar components $R_2$, $R_4$, V—6 and $C_2$ perform corresponding functions in association with V—2 on the other side of the push-pull circuit.) The plates of diodes V—5 and V—6 are connected to a point more negative than that to which the grid circuits of V—1 and V—2 are returned, the latter point being more negative than the cathodes of V—1 and V—2 in order to provide grid bias. These voltages are established by resistors $R_a$ and $R_b$ in the cathode circuit. As explained below in connection with Fig.

3, resistors $R_a$ and $R_b$ differ from each other in value by a moderate amount so that the clipping of a positive peak in V—1 does not begin simultaneously with clipping of a negative peak by V—6 and likewise, the clipping of a positive peak by V—2 does not begin simultaneously with clipping of a negative peak by V—5. It is not particularly important which clipping process takes place first, but it is desirable for one to precede the other in order that the combined process will provide a smoother transition and mitigate the production of undesirable high-frequency components. A slightly lower average plate current, which may be desirable for reasons of power economy, is obtained if the clipping by the diode slightly precedes clipping by V—1 or V—2, rather than the reverse—in other words, if $R_a$ is somewhat greater than $R_b$.

When current flows through $R_1$ and $R_3$ to produce clipping (by preventing the grid of V—1 from further following the signal provided across $R_7$ and $R_9$ by tube V—3), condenser $C_1$ charges through $R_3$ and for a brief instant mitigates the building up of voltage by flow of current through $R_1$, thus absorbing the initial impact of the clipping transient and permitting the grid of V—1 to rise in potential just enough to avoid a sharp transition in the output wave after flow of grid current sets in. The exact size of $R_1$, $R_3$ and $C_1$ is to be determined with respect to the band width of the signal and the permissible extent of abruptness of clipping. $R_3$ will usually be considerably smaller than $R_1$, and if $R_3$ should be omitted, the resistance inherent in the tubes V—1 or V—5 will provide the charging resistance for $C_1$ and may in some cases be sufficient for that purpose. The function of $C_2$ is similar to that of $C_1$ and therefore need not be described further.

Condensers $C_3$ and $C_4$ are small condensers to provide negative feedback to the grid circuit respectively across resistors $R_9$ and $R_{10}$. The size of these components is such that the feedback is small at most signal frequencies, but begins to be substantial near the upper frequency limit of the signal band and is considerably effective at frequencies just above the signal band. Because of the coupling of the plate circuits of V—1 and V—2 through the winding of transformer T, modification of the output wave form of one tube will be immediately applied to the plate of the other. As mentioned before, $R_a$ and $R_b$ differ in magnitude by some appreciable amount, say 10, 20 or 30 percent, so that one side of the push-pull circuit begins to clip before the other does so. During that interval negative feedback is applied not only to the tube which is clipping but also the other tube which has not yet reached clipping conditions. The result will be that the other tube will tend to compensate for the clipping that has set in at the other side of the circuit (this will tend to hasten the second stage of clipping, but too brief a transition can be avoided by providing sufficient difference between the values of $R_a$ and $R_b$). The time constant of the negative feedback circuit is made so short that the effect of the feedback is not simply to drive the second side of the circuit to clipping condition, but rather merely to round off the transition produced by the beginning of clipping by one side of the circuit. The negative feedback is also present when the second side of the circuit has begun to clip the signal, but it is then less effective since the result is merely to increase the current flowing through resistors $R_1$, $R_3$, $R_2$ and $R_4$. So far as the high-frequency components are concerned, however, they nevertheless have a certain effectiveness because resistors $R_1$ and $R_2$ are by-passed by small capacitances $C_1$ and $C_2$ respectively.

For the purpose of further explanation, let it be assumed that the grid voltage-plate current characteristic of tubes V—1 and V—2 is as shown in Fig. 2. Point A on the curve is the no-signal operating point, the voltage *a* being the grid bias produced by the voltage drop in resistance $R_a$. To the right of the zero grid voltage axis the effective characteristic departs from the normal curve and follows the broken line *x* on account of the clipping action produced by the flow of grid current. To the left of point B the effective characteristic branches off along the broken line *y* on account of the clipping effect of the diode current. The voltage *b* is that produced across resistor $R_b$. In Fig. 2 voltage *a* is greater than voltage *b* approximately in the ratio of 5 to 4.

Fig. 3 shows the effect of difference between voltage *a* and voltage *b* on the output wave form, but in this case an *a*:*b* ratio of 3:2 has been chosen to make the effect more clear. The effect of condensers $C_1$ and $C_2$ and also that of negative feedback has been omitted in Fig. 3 in order to single out the effect of two-step clipping produced by the inequality of voltages *a* and *b*. The solid line *s* represents the output wave form. The dashed line shows the signal peaks as they might appear in the input wave across resistors $R_7$, $R_9$, $R_8$ and $R_{10}$. At points P, tubes V—5 and V—6 begin to clip the signal, acting alternately on succeeding half cycles. From P to Q only one tube of the push-pull pair is amplifying normally, the other being in clipping condition. The output wave then continues at half-slope until Q is reached, when the grids of V—1 and V—2 (respectively on alternate half cycles) begin to draw current and clip the signal at that point. From Q to R the clipping is complete, both sides of the push-pull circuit being overdriven. From R to T the clipping is again effective on only one side of the circuit and from T back to the mid-signal axis the wave is normally amplified. The provision of the half-slope segments PQ and RT between the normally amplified portions and the fully clipped portions of the wave "softens" or "blunts" transition "corners" of the clipped wave. This reduces the intensity of high frequency components introduced by the clipping process and makes it easier to complete the rounding-off of the wave by the action of negative feedback and of condensers $C_1$ and $C_2$. If the wave is effectively rounded off by such operation of the clipping stage, it is then possible to dispense with some filtering in later stages which would have been necessary for utilization of a less rounded wave.

Use of diodes V—5 and V—6 is not necessary to produce two-stage clipping, although they are convenient for setting the exact maximum amplitude independently of the cut-off characteristics in tubes V—1 and V—2 and of variations in such characteristics in tubes of a given commercial type. Tubes V—1 and V—2 could be operated in class AB service instead of class A service, which is to say that the plate current may be cut off during part of the signal cycle. If the grid bias is adjusted so that grid current commences to flow in one tube shortly after the plate current has been cut off in the other, a fairly rounded clipping characteristic would result. This would correspond to operation with a grid bias given by point C on the curve in Fig. 2. The converse type of two-stage clipping, with grid circuit overload in one tube preceding cut-off in the other could be obtained with a grid bias corresponding to a point A, it being noted in this case that the plate current cut-off takes place more gradually than the grid circuit overload in the type of tube for which the characteristic is given in Fig. 2. In class AB operation the plate current will vary more with signal amplitude than in the class A case, and in the case of grid bias produced by a resistor in the cathode circuit, variation in grid bias is to be expected. But so far as the clipping characteristic is concerned, it is the plate current for signals large enough to be clipped that counts, and the variation in clipping amplitude for different signals resulting from the more gradual clipping by plate current cut-off than by grid circuit overload should generally be tolerably small.

Fig. 4 shows an amplifier using plate current cut-off instead of diodes V—5 and V—6 of Fig. 1 to provide one stage of the clipping operation. Cathode resistor $R_c$ sets the grid bias. Condenser $C_5$ may be omitted, in which case increased negative feedback of the unbalance produced by asymmetrical clipping takes place, but normally enough distribution of the negative feedback takes place through the coupling of the push-pull plate circuits with each other through transformer T, and it is easier to enhance the high-frequency effect of the feedback produced through condensers $C_3$ and $C_4$ than to do the same with feedback in the cathode-to-ground path.

Except for the notation of certain differences between Fig. 4 and Fig. 1, it may simply be said that the circuit of Fig. 4 operates like that of Fig. 1. The omission of the diodes and the fulfilling of their function by plate current cut-off in V—1 and V—2 has already been explained. In Fig. 4, negative feedback is provided so as to include the preceding stage also, in a circuit that is particularly suitable when V—3 and V—4 are high-gain tubes. Finally, in Fig. 4, $R_3$ is not in the direct current grid current path, although it still functions as a charging resistor affecting the rate of charge of $C_1$. $C_2$ and $R_4$ are similarly arranged on the other side of the circuit. The function of $C_1$ and $C_2$ is still essentially the same as in Fig. 1.

In certain of the claims the term "rectified current" is used to refer to current which flows in a circuit including a rectifier, regardless of whether the rectifier in question be thermionic or of some other type, or whether it is a separate element or merely the control-grid to cathode path of one of the amplifier tubes. In the circuits of this invention such rectified current, at least in the impedances inserted in series with the amplifier control electrodes to produce limiting, is pulsating rather than steady and flows during only a portion of the signal cycle (corresponding to the limited signal peaks).

What is claimed is:

1. A push-pull electrical limiting amplifier including a pair of electron discharge tubes, each having an anode, a cathode and at least one control electrode, a balanced input circuit for accepting a signal and applying voltages produced thereby on a control electrode of each tube, a balanced output circuit including the anode-cathode paths of said tubes, at least one unidirectional conduction path between each of said control electrodes and the midpoint of said balanced input circuit, an impedance including a high resistance between each of said control electrodes and the corresponding input terminal of said balanced input circuit, means for deriving and applying to said unidirectional paths bias voltage of such magnitude that the anode-cathode paths of both tubes pass current at output signal amplitudes less than a lower limiting level and that the output wave of each tube is limited at said lower limiting level on input signal peaks of one polarity and at a substantially higher limiting level on input signal peaks of the other polarity, whereby on each signal peak exceeding said higher limiting level one of said tubes limits at said lower limiting level and the other tube at said higher limiting level.

2. An amplifier according to claim 1 in which said impedances include networks in series with said control electrodes, which networks have an impedance which is high but finite at zero frequency and diminishes with increasing frequency, being substantially lower at frequencies slightly higher than the highest signal frequency.

3. An amplifier according to claim 2 having also means to provide negative feedback around said amplifier, said means including resistances and capacitances such that said negative feedback is substantially less effective at signal frequencies than at frequencies, higher than the highest signal frequency, corresponding to signal harmonics resulting from limiting of voltage peaks in said amplifier.

4. A push-pull electrical amplifier including a pair of electron discharge tubes each having an anode, a cathode and at least one control electrode, an input circuit for accepting a signal and applying voltages produced by said signal on a control electrode of each tube in push-pull relation, said input circuit including two high impedance networks respectively in series with the control electrode of each of said tubes, said networks having an impedance characteristic which is finite at zero frequency and decreases with frequency in the neighborhood of maximum signal frequencies, unidirectional conduction paths of both polarities from each of said control electrodes to sources of bias voltage such that voltage peaks of both polarities produced by said signal on said control electrodes are limited by conduction over said paths and a voltage peak is limited at the control electrode of one of said tubes before the corresponding voltage peak at the control electrode of the other tube begins to be limited, a push-pull output circuit including the anode-cathode path of said tubes, and balanced negative feedback paths from said output circuit to said input circuit having a high impedance decreasing with frequency such as to develop a feedback voltage increasing substantially with frequency in the neighborhood of maximum signal frequencies.

5. A push-pull electrical amplifier including a pair of electron discharge tubes each having an anode, a cathode and at least one control electrode, an input circuit for accepting a signal and applying voltages produced by said signal on a control electrode of each tube in push-pull relation, said input circuit including two high impedance networks respectively in series with the control electrode of each of said tubes, said networks each including a high resistance path from said control electrode to respective points where signal voltage is applied, said networks having an impedance characteristic which decreases with frequency in the neighborhood of maximum signal frequencies, unidirectional conduction paths of both polarities from each of said control electrodes to sources of bias voltage for limiting voltage peaks at said electrodes and a push-pull output circuit including the anode-cathode path of said tubes.

6. An amplifier according to claim 5 having balanced negative feedback paths from the output circuit to circuit points on the input side of said networks, said feedback paths including resistance and capacitance in a series combination having a relatively short time constant adapted to develop a feedback voltage increasing substantially with frequency in the neighborhood of maximum signal frequencies.

7. A push-pull electrical amplifier including a pair of electron discharge tubes, each having an anode, a cathode and at least one control electrode, a balanced input circuit for accepting a signal and applying voltages produced thereby on a control electrode of each tube, a balanced output circuit including the anode cathode paths of said tubes, impedances individually in series with each of said control electrodes adapted to limit the voltage maxima and minima on said electrodes substantially to the voltage at which rectified current begins to flow through said respective impedances, a biased rectifier in shunt with the cathode-control electrode path of each of said tubes polarized to provide conduction on negative signal peaks, means for providing operating negative bias for said control electrodes, the bias of said rectifiers being such, in relation to the operating bias of said control electrodes, that the signal amplitude at which current begins to flow through said rectifiers and said impedances is substantially different from the amplitude at which rectified current begins to flow through said impedances in the opposite direction on positive signal peaks.

8. An amplifier according to claim 7 in which the bias provided for said rectifiers is such, in relation to the operating bias of said control electrodes, that the signal amplitude at which current begins to flow through said rectifiers and said impedance is substantially smaller than the amplitude at which rectified current begins to flow through said impedances in the opposite direction on positive signal peaks.

9. An amplifier according to claim 7 in which said impedances consist of networks having an impedance which is high but finite at zero frequency and diminishes with increasing frequency, being substantially lower at frequencies slightly higher than the highest signal frequency.

10. An amplifier according to claim 7 having also means to provide negative feedback around said amplifier, said means including resistances and capacitances such that said negative feedback is substantially less effective at signal frequencies than at frequencies, higher than the highest signal frequency, corresponding to signal harmonics resulting from the limiting of voltage peaks in said amplifier.

WM. REDIN WOODWARD.

REFERENCES CITED

The following references are of record in the file of this patent:

UNITED STATES PATENTS

| Number | Name | Date |
|---|---|---|
| 2,086,595 | Anderson | July 13, 1937 |
| 2,153,202 | Nichols | April 4, 1939 |
| 2,294,200 | Norman | Aug. 25, 1942 |
| 2,373,997 | Boykin | Apr. 17, 1945 |
| 2,395,615 | Curtis | Feb. 26, 1946 |